Aug. 9, 1955   R. W. RHOADS, SR   2,715,040
MOVABLE PARTITION FOR COVERED VEHICLE BODY
Filed July 24, 1952

Ralph W. Rhoads, Sr.
INVENTOR.

BY *Clarence A. O'Brien*
*and Harvey B. Jackson*
Attorneys

United States Patent Office 2,715,040
Patented Aug. 9, 1955

2,715,040

MOVABLE PARTITION FOR COVERED VEHICLE BODY

Ralph W. Rhoads, Sr., Springfield, Mo.

Application July 24, 1952, Serial No. 300,573

4 Claims. (Cl. 296—24)

This invention relates in general to wall structures, and more particularly to a movable partition wall construction.

The primary object of this invention is to provide an improved movable partition construction which may be utilized in combination with elongated bodies for dividing the same into a plurality of compartments.

Another object of this invention is to provide an improved partition construction for elongated bodies which includes spaced frame members which both reinforce said body and form frames for a movable partition, said partition being selectively positioned with respect to said frames for dividing said body into compartments of different sizes.

Another object of this invention is to provide means for dividing a refrigerator body into two compartments whereby the volume to be refrigerated may be reduced in accordance with the volume of material loaded within the body.

Another object of this invention is to provide an improved partition wall for use in elongated bodies, said partition wall being so designed and constructed whereby the same may be easily and quickly positioned and removed and at the same time forming a relatively tight seal with the walls of a body in which it is disposed.

A further object of this invention is to provide an improved removable partition wall for dividing refrigerated bodies into compartments, said partition wall conforming to the general configuration of the refrigerated body's cross-section and being formed in sections whereby the same may be conveniently folded for removal from a position within a frame member of the body, said partition wall being provided with a door to permit access to a compartment formed by said partition wall.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 3:
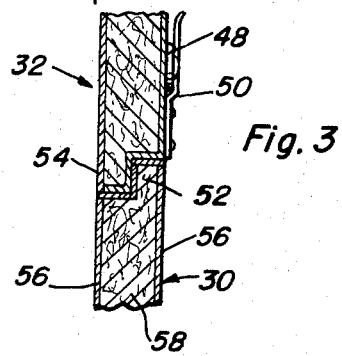
Figure 4:
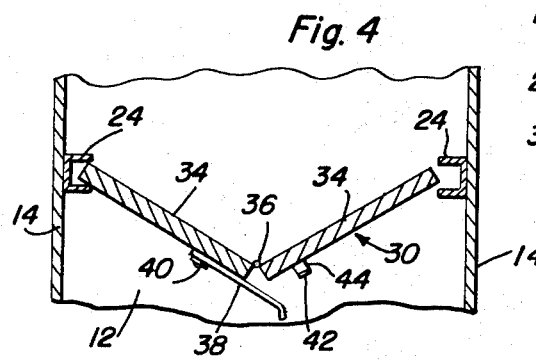
Figure 2:
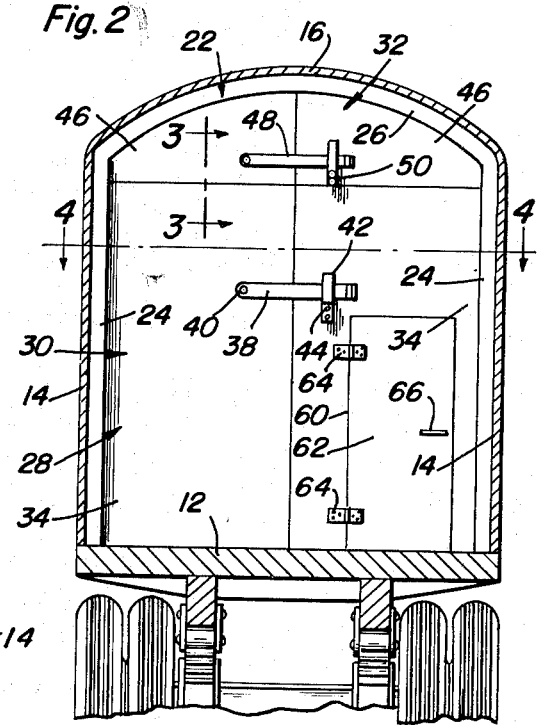
Figure 2 is an enlarged fragmentary transverse vertical sectional view taken substantially upon a plane indicated by the section line 2—2 of Figure 1 and shows the general configuration of a partition wall and its relationship with the interior of the trailer body of Figure 1.

Figure 3 is an enlarged fragmentary transverse vertical sectional view taken substantially upon the plane indicated by the section line 3—3 of Figure 2 and shows the construction of a joint between upper and lower parts of the partition wall; and Figure 4 is a fragmentary transverse horizontal sectional view taken substantially upon the plane indicated by the section line 4—4 of Figure 2 and shows the manner in which sections of the lower part of the partition wall are connected together, the lower part of the partition wall being illustrated in a partially folded position.

Similar characters of reference designate similar or identical elements and portions throughout the specification and throughout the different views of the drawings.

Figure 1:
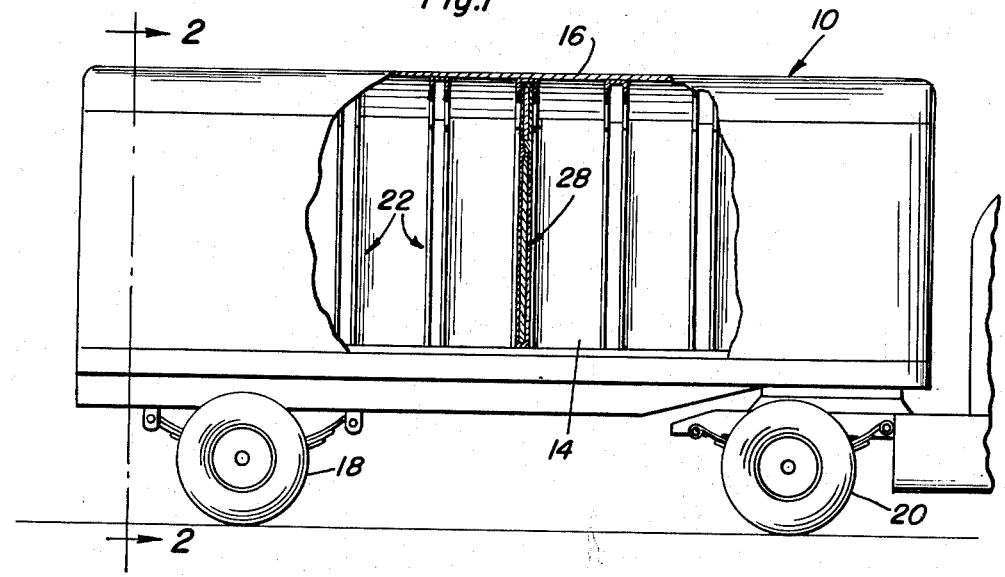
Figure 1 is a side elevational view of a conventional refrigerated trailer body which has a forward end thereof mounted on a rear portion of a tractor, a portion of the side wall of the trailer body being broken away in order to clearly illustrate the details of the interior construction thereof.

Referring now to Figures 1 and 2 in particular, it will be seen that there is illustrated a conventional refrigerated trailer body which is referred to in general by the reference numeral 10. The trailer body 10 is of a conventional construction and includes an insulated floor 12 which has extending upwardly therefrom side walls 14 whose upper ends are connected by an arcuate roof 16. The rear end of the trailer body 10 is supported by a conventional wheel structure 18 and the forward end thereof is supported on the rear portion of a tractor 20.

Inasmuch as the average refrigerated trailer body, such as the trailer body 10, is in the form of an elongated single compartment, it will be readily apparent that when a partial load is being carried, a portion thereof is being unnecessarily refrigerated. Also, it will be readily seen that the temperature throughout the refrigerated body will be the same and therefore only one general type of product may be carried at a time. It is, therefore, desirable to provide a suitable partition wall which may be selectively positioned within the refrigerated trailer body 10 for dividing the same into two separate compartments whereby the refrigeration may be limited to either the forward compartment or a differential in temperature may be maintained between the two compartments so formed.

It will be understood that the sides and roof of a trailer body are normally supported by longitudinally spaced frame members. It is the intention of this invention to form such frame members which are referred to by the reference numeral 22, of channel-shaped elements which open inwardly to form a continuous socket along the sides and tops thereof. It will be noted that the frame members 22 are of an inverted U-shape and that each frame member includes a pair of spaced vertical portions 24 connected at their upper ends by an arcuate transverse portion 26, the transverse portion 26 supporting the roof 16 of the trailer body 10.

Adapted to extend transversely of the trailer body 10 and being positioned within one of the frame members 22 is a removable partition wall which is referred to in general by the reference numeral 28. The partition wall 28 includes a lower part, which is referred to in general by the reference numeral 30, and an upper part, which is referred to in general by the reference numeral 32.

The lower part 30 of the partition wall is generally rectangular in outline and includes a pair of sections 34 which are hingedly connected together along a vertical center line of the partition wall 28 by an elongated piano hinge 36. As is best illustrated in Figure 4, when the sections 34 of the lower part 30 are partially folded, the edges of the same may be conveniently positioned between the flanges of the vertical portions 24 of one of the frame members 22. After the edge portions of the sections 34 have been inserted within the vertical portions 24 of a frame member, they are moved into a common vertical plane and secured in that position by a latch bar 38 pivotally connected to one of the sections 34 by a pivot pin 40 and having an end portion thereof disposed behind a vertical flange 42 spaced from the other section 34. The vertical flange 42 is a portion of a Z-shaped keeper 44 which is rigidly secured to the other of said sections 34.

Referring now to Figure 2 in particular, it will be seen that inasmuch as the upper portion of the trailer body 10 is arcuate, the lower part 30 of the partition wall 28 may not extend up into the arcuate portion thereof and at the same time be removable. Therefore, the space above the lower part 30 is filled by the upper part 32 which is in a common vertical plane with the lower part 30.

The upper part of the partition wall 28 includes a pair of sections 46 which are hingedly connected together by a vertical piano hinge (not shown) identical to the piano hinge 36, but of a lesser length. It will be understood that the widths of the sections 46 are equal to the widths of the sections 34 and that their hinged joint is in alignment with the hinged joint between the sections 34.

When it is desired to position the upper part 32 of the partition wall 28 in place, the same is moved to the position illustrated in Figure 4 with respect to the lower part 30 and the end portions of the sections 46 disposed within the vertical portions 24 of the associated frame member 22. The sections 46 are then moved into a common vertical plane and locked in place by a latch bar 48 which is associated with a keeper 50, the latch bar 48 and the keeper 50 being identical to the latch bar 38 and keeper 44. After the sections 46 have been latched in a common vertical plane, they are slid upwardly to the position illustrated in Figure 2.

After the upper part 32 has been positioned within a frame member 22, the lower part 30 associated therewith is positioned in the manner outlined above.

In order that the lower part 30 may be removably joined to the upper part 32 in sealing relation therewith, the two parts are joined together in the manner best illustrated in Figure 3. It will be noted that the sections of the lower part 30 are provided with vertically extending flanged portions 52 which are in face-to-face engagement with depending vertical flanges 54 of the sections of the upper part 32. By providing such an overlapping joint, the juncture between the lower part 30 and the upper part 32 is tightly sealed and prevents the leakage of cold air therethrough.

Inasmuch as the partition wall 28 is intended to be utilized in a refrigerator trailer body, such as the trailer body 10, the sections thereof are of a double wall construction and include a pair of spaced walls 56 which have disposed therebetween insulation 58. It will be understood that the insulation 58 will be of a sufficient thickness to substantially prevent transfer of heat from one compartment to the other.

Referring now to Figure 2 in particular, it will be seen that in order that access to a forward compartment of the trailer body 10 may be obtained, the section 34 of the lower part 30 which is provided with the keeper 44 is provided with a doorway 60 in which is mounted a hinged door 62, the door 62 being connected to its respective section 34 by a plurality of hinges 64. The opening and closing of the door 62 is controlled by a latch mechanism 66.

It will be seen that by providing a refrigerated body, such as the refrigerated trailer body 10, with a removable partition wall which may be selectively positioned within the body, that the body may be divided into two separate compartments. In the case where only a relatively small load is being carried by the truck or trailer, the partition wall 28 is positioned adjacent the rear of packages which have been all loaded in either the forward end or of the rear end of the body, according to where the refrigeration unit is positioned. By confining the refrigerated articles to a relatively small portion of the body, it will be seen that the refrigeration of the same is relatively simple and that there is no waste.

The provison of a removable partition wall also permits the transporting of different types of refrigerated materials within a single refrigerated body. It will be seen that the portion of the body which contains the refrigeration unit may be loaded with articles that must remain frozen, whereas the other portion of the body may be filled with articles which need only remain at a cool temperature and should not be frozen. By so equipping a truck or trailer body, it will be seen that various types of loadings may be accomplished.

While the partition wall, which is the subject of this invention, has been illustrated and described primarily for use with a refrigerated trailer body, it will be understood that the partition wall is not so limited, but may be utilized with any type of container which requires a frame construction and which is desirable to have selectively divided into compartments.

The operation of this device will be understood from the foregoing description of the details thereof, taken in connection with the above recited objects and drawings. Further description would, therefore, appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A container construction comprising an elongated body, said body having side and top walls, an inverted generally U-shaped frame member extending transversely of said body and reinforcing said side and top walls, and a partition wall having sections mounted for swinging and sliding movement relative to said frame member, said partition wall conforming to the general outline of said frame member and being removably interlocked with said frame member to divide said body into individual compartments, said frame member being channel-shaped in cross section and including spaced inwardly directed flanges, said partition wall being disposed within the confines of said frame member having edge portions positioned between said flanges.

2. A container construction comprising an elongated body, said body having side and top walls, an inverted generally U-shaped frame member extending transversely of said body and reinforcing said side and top walls, and a partition wall having sections mounted for swinging and sliding movement relative to said frame member, said partition wall conforming to the general outline of said frame member and being removably interlocked with said frame member to divide said body into individual compartments, said frame member being channel-shaped in cross section and including spaced inwardly directed flanges, said partition wall being disposed within the confines of said frame member having edge portions positioned between said flanges, said frame member being sealed relative to said side and top walls and said partition wall being sealed relative to said frame member whereby said compartments are sealed relative to each other.

3. A container construction comprising an elongated body, said body having side and top walls, an inverted generally U-shaped frame member extending transversely of said body and reinforcing said side and top walls, and a partition wall, said partition wall conforming to the general outline of said frame member and being removably interlocked with said frame member to divide said body into individual compartments, said frame member being channel-shaped in cross section and including spaced inwardly directed flanges, said partition wall being disposed within the confines of said frame member and having edge portions positioned between said flanges, said partition wall including a lower part and an upper part, said upper part projecting up into the upper part of said frame member and being supported by said lower part, said upper and lower parts being formed in sections pivotally connected together to facilitate insertion in said frame member.

4. A container construction comprising an elongated body, said body having side and top walls, an inverted generally U-shaped frame member extending transversely of said body and reinforcing said side and top walls, and a partition wall, said partition wall conforming to the general outline of said frame member and being removably interlocked with said frame member to divide said body into individual compartments, said frame member being channel-shaped in cross section and including spaced inwardly directed flanges, said partition wall being disposed within the confines of said frame member and having edge portions positioned between said flanges, said partition wall including a lower part and an upper part, said lower and upper parts being formed in sections, said upper part projecting up into the upper part of said frame member and being supported by said lower part, said frame member being sealed relative to said side and top walls and said partition wall being sealed relative to said frame member whereby said compartments are sealed relative to each other.

References Cited in the file of this patent

UNITED STATES PATENTS

| Number | Name | Date |
|---|---|---|
| 123,056 | Stahlnecker | Jan. 23, 1872 |
| 537,702 | Morton | Apr. 16, 1895 |
| 933,617 | Boll | Sept. 7, 1909 |
| 954,075 | Bowen | Apr. 5, 1910 |
| 1,051,762 | Reynolds | Jan. 28, 1913 |
| 1,300,130 | Derbyshire | Apr. 8, 1919 |
| 1,524,005 | Dodge | Jan. 20, 1925 |
| 1,658,853 | Murray | Feb. 14, 1928 |
| 1,858,408 | McEniry | May 17, 1932 |
| 1,896,198 | MacMillan | Feb. 7, 1933 |
| 2,143,788 | Miller | Jan. 10, 1939 |